Figure 4:
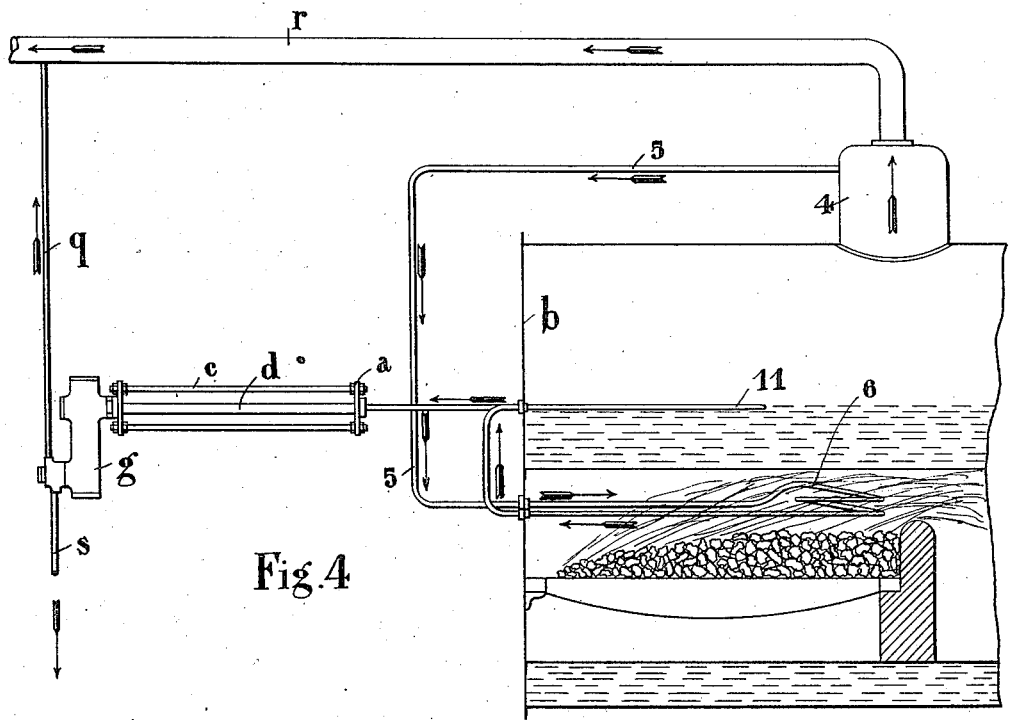

W. EAST, A. E. DOBBS & J. S. HOWKINS.
THERMOSTATIC LIQUID REGULATOR.
APPLICATION FILED FEB. 11, 1910.
1,011,041.
Patented Dec. 5, 1911.
3 SHEETS—SHEET 1.
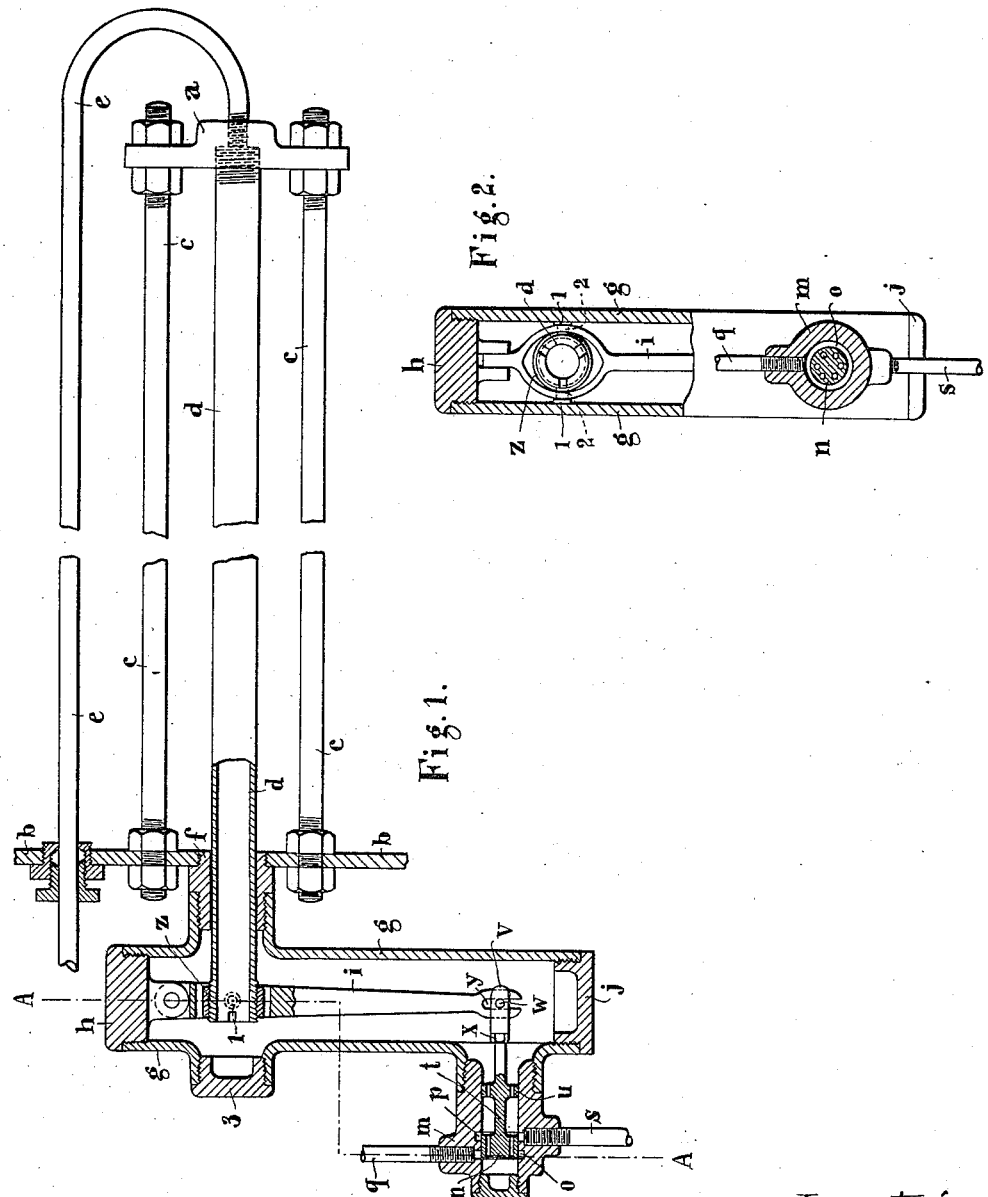
Attest:
Ewd L. Tolson
Edward N. Santon
Inventors:
Walter East,
Archibald E. Dobbs,
John S. Howkins,
by Spear, Middleton, Donaldson & Spear
attys.

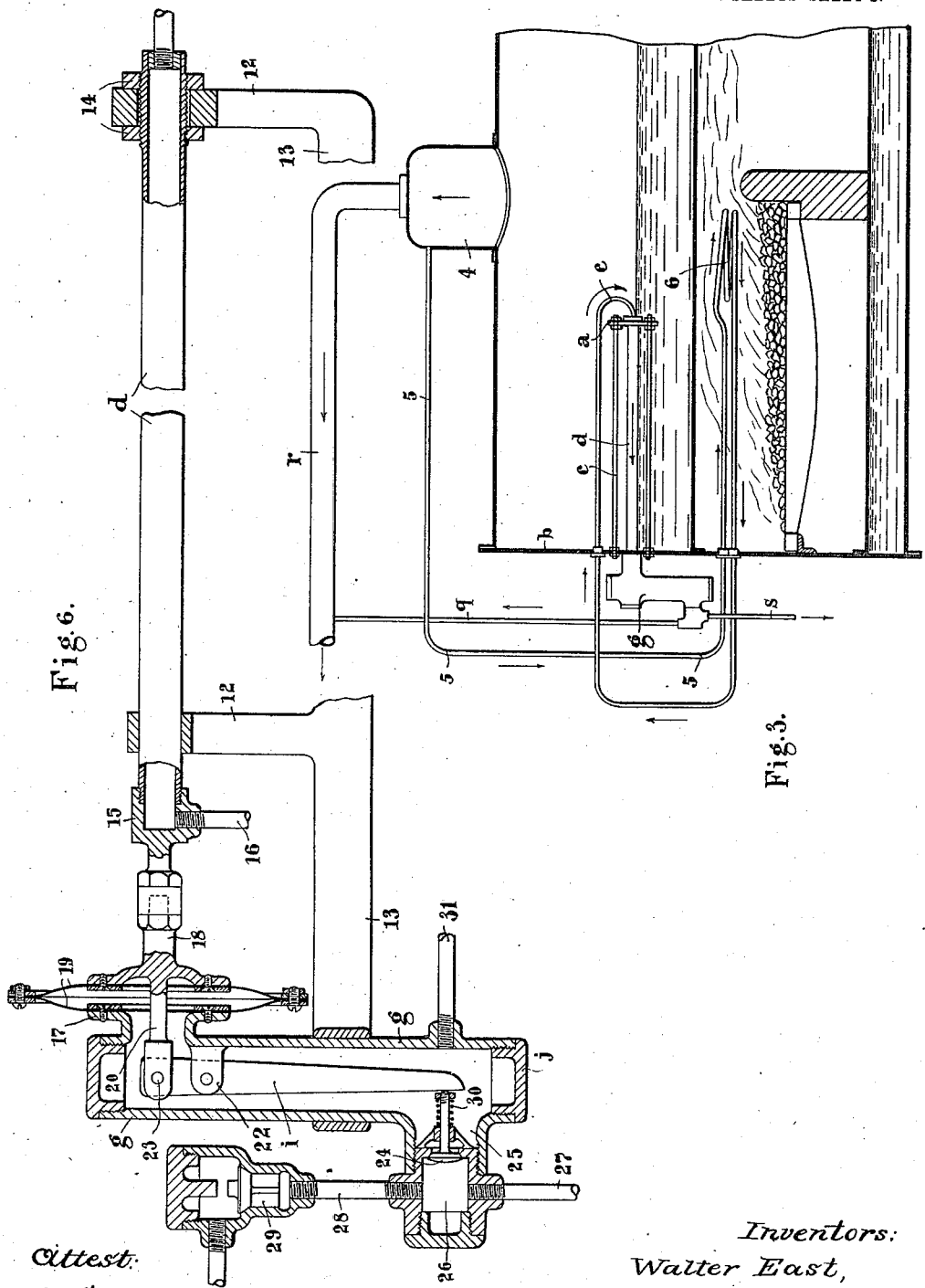

UNITED STATES PATENT OFFICE.

WALTER EAST, OF BOURNEMOUTH, ENGLAND, ARCHIBALD EDWARD DOBBS, OF CASTLE DOBBS, NEAR CARRICKFERGAS, IRELAND, AND JOHN SHIRLEY HOWKINS, OF FULHAM, LONDON, ENGLAND.

THERMOSTATIC LIQUID-REGULATOR.

1,011,041. Specification of Letters Patent. Patented Dec. 5, 1911.

Application filed February 11, 1910. Serial No. 543,370.

*To all whom it may concern:*

Be it known that we, WALTER EAST, J. P., of Dol Peris, Surrey Road, Bournemouth, in the county of Hants, England, ARCHIBALD EDWARD DOBBS, J. P., of Castle Dobbs, near Carrickfergas, county Antrim, Ireland, and JOHN SHIRLEY HOWKINS, of 40 Waldemar Mansions, Waldemar avenue, Fulham, in the county of London, England, engineer, all subjects of the King of Great Britain and Ireland, have invented certain new and useful Improvements in and Relating to Thermostatic Liquid-Regulators, of which the following is a specification.

This invention relates to improvements in thermostatic apparatus for maintaining a constant liquid level in steam generators and the like.

In such constructions as have been hitherto proposed the operating element, by the expansion and contraction of which the valve or the like controlled by the thermostat is moved, has been exposed externally to the furnace gases and filled internally with water or steam according to the level of the water in the boiler, the variation in temperature of this element being obtained by the difference between the rates of absorption of heat from the element by the steam and water which alternately fill the greater part of its interior. As it was necessary that the thermostat should be placed in the path of the furnace gases at a height corresponding with the desired water level in the boiler, it is not applicable to all types of boilers. Further the operating element was gradually burned away by the fire and an explosion was likely therefore to occur as the interior of the element was at the full boiler pressure, also being placed thus in the furnace the thermostat was difficult to adjust and repair.

The object of the present invention is to provide a thermostatic apparatus for maintaining a constant liquid level, which shall not be burned away in operation and shall be of simple and easy construction.

The invention consists in a thermostatic controlling device in which the operating element consists of a tube anchored at one end through which passes fluid at a substantially constant temperature, said tube being surrounded externally by a liquid or gas or vapor, the change in length of said tube consequent upon change in its temperature being determined by the amount of surface of said tube exposed externally to said liquid or gas or vapor.

The invention also consists in a thermostatic controlling device as set out above, arranged to maintain a constant water level in a boiler in which steam superheated to a constant temperature is passed through the interior of said tube which is surrounded externally by water and steam, said tube by its extension or contraction in accordance with the changes of water level in said boiler controlling means whereby the superheated steam passing through it is led into the steam supply pipe from the boiler or to a pump or the like supplying feed water thereto, or into the atmosphere or the condenser.

The invention further consists in the improved thermostat and feed water controlling devices hereinafter described.

Figure 5:
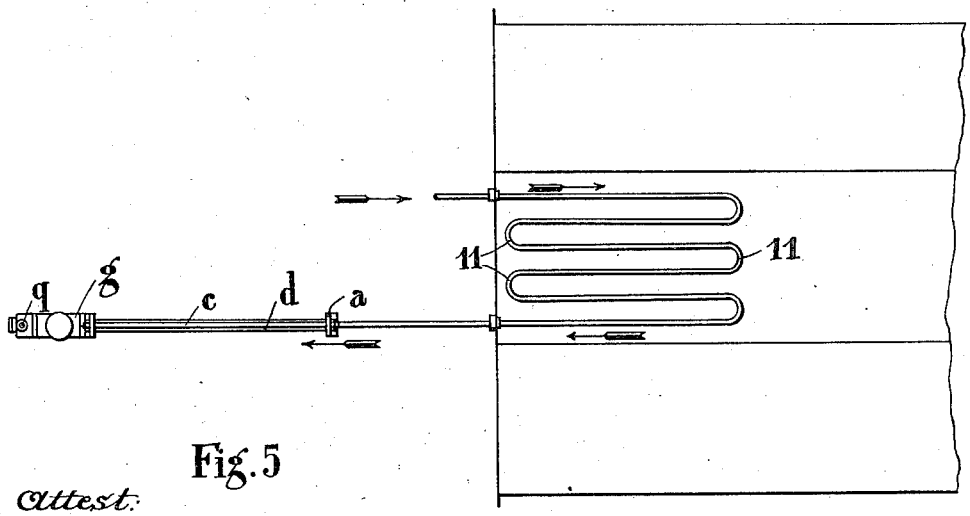

Referring now to the accompanying drawings, Figure 1 shows side elevation of one form of our improved thermostat as used for maintaining a constant water level in a boiler. Fig. 2 is a section on the line A A of Fig. 1. Fig. 3 is a diagrammatic sketch showing our thermostat as placed within a boiler. Fig. 4 is a vertical section and Fig. 5 is a sectional plan of part of a Cornish boiler showing our improved thermostat arranged outside the boiler at the front. Fig. 6 shows a side elevation of another form of our improved thermostat fixed outside a boiler as used for maintaining a constant water level in a boiler.

In carrying this invention into effect according to the construction shown in Figs. 1 and 2, a back-plate, $a$, is secured rigidly to the boiler shell, $b$, in any convenient position at the normal water level by two or more rods or bars, $c$. Into this backplate, $a$, there screws a tube $d$, made of any suitable material, preferably with a high coefficient of expansion, and this tube, $d$, passes through a suitable opening in the boiler shell, $b$, and operates a valve controlling the supply of steam to a feed water pump, injector or the like in a manner to be hereinafter described. Into the end of the tube, $d$, which is attached to the backplate, $a$, steam at a temperature above that corresponding to the pressure of the steam in the boiler is led by a pipe, $e$. This steam may be taken from the boiler in which the water level is to be maintained constant and superheated as shown in Fig. 3 or the steam may be taken from an independent source so long as its temperature is higher than that of the steam within the boiler. Attached to the boiler shell, b, by a nipple union f, or other suitable means is a steam tight casing, g. The tube, d, passes through the nipple union, f, which is a sliding fit over the former. At one end of the casing, g, is a screw plug, h, to which is fulcrumed a lever, i. The other end of the casing, g, is also preferably closed by a screw plug, j. Screwed into the side of the casing, g, at or near the end remote from that at which the lever, i, is fulcrumed is another casing, m, in which works a valve, n, controlling two ports, o and p, one of which communicates with a pipe, q leading to the steam main, r, and the other communicates with a pipe s, leading to a feed water pump or the like (not shown) as indicated in Figs. 3 and 4. The valve, n, is made of such length that when in its mid-position, it is just short of the ports, o and p, at each end as shown in Fig. 1. The valve, n, is made in one with a spindle, t, on which is provided a guide, u. Both the guide, u, and the valve, n, are pierced to allow the steam to pass to the other side thereof. The end of the valve spindle, t, screws into a forked end, v, in which is a pin, w. By this means the distance between the centers of the pin, w, and the valve n, can be adjusted, a nut x, being provided on the valve spindle, t, to act as locking means when so adjusted. The pin, w, engages with a slot, y, in the end of the lever, i, remote from its fulcrum. At an intermediate point in its length, but preferably near its fulcrumed end, the lever, i, is secured to the tube d, in any suitable manner, a convenient construction is hereinafter described. The end of tube, d, which extends outside the boiler shell, b, is made of a slightly larger diameter than the rest of the tube this end being screwed into a ring, z, having two pins, 1, arranged diametrically opposite to each other and extending outward. A loop is formed through the lever, i, of sufficient size to admit freely the ring, z, and the two pins, 1, engage with holes, 2, in the lever, i. By providing the casing, g, with a screw plug, 3, opposite the end of the tube, d, it is then possible to unscrew the latter from the ring, z, and the back plate, a, and so withdraw it.

The action of the thermostat and valve is as follows:—Steam is led from the steam space of the boiler for instance from the steam dome, 4, by a pipe 5 to a superheating coil, 6, placed in any convenient place in the path of the furnace gases. From this superheating coil, 6, the steam is led by the pipe, o, into the interior of the tube, d, and thence to the casing, g. The tube d is placed at the normal level of the water in the boiler and while this level is maintained, the tube, d, is just immersed in the water and the length of this tube, d, is determined by the temperature of the superheated steam within it and the rate of absorption of heat by the water without, the valve being then adjusted so that the steam passes from the casing, g, by port, o and pipe, q, into the main steam pipe, r. Should the water however fall below this level, the tube, d, is immersed in steam and the rate of absorption of heat from the superheated steam within the tube, d, is less than the rate of absorption when said tube is immersed in water. This tube consequently gets hotter and expands moving the valve, n, in such a manner that steam from the casing, g, escapes by the port, p, and pipe, s, to a pump or the like (not shown) supplying feed water to the boiler.

In a modification of this arrangement as shown in Figs. 4 and 5, the thermostat is arranged outside the boiler, the superheated steam passing through a grid, 11, or the like arranged at the normal water level of the boiler and then into the tube, d. It will be seen that the temperature of the steam in the tube, d, will depend on whether the grid, 11, is immersed in water or steam. The expansion and contraction of the tube, d, controls the supply of feed water in a similar manner to that already described with reference to Figs. 1 and 2.

In the modification shown in Fig. 6, the tube, d, is mounted in two uprights, 12, attached to a frame, 13, which frame also carries the casing, g, and the feed water controlling means. The end of the tube, d, remote from the casing, g, is rigidly held in its upright by two nuts, 14, by means of which also the length of the tube, d, can be adjusted. Into one end of this tube, superheated steam is led after having passed through a grid, 11, and the other end of the tube, d, is closed by a cap, 15, or the like. Steam from an independent source can be used if required. A pipe, 16, leading to the steam main, r, communicates with this end of the tube, d, in any convenient manner so as to permit circulation of the steam through the tube, d. In the side of the casing, g, opposite the end of the tube, d, is an opening having a flange, 17. To the cap, 15, on the end of the tube, d, there screws a member, 18, reaching nearly but not quite up to the opening on the casing, g, and having a flange similar to the flange 17. These two flanges are connected by two dished thin metal diaphragms, 19, bolted or otherwise secured together at their circumference. Extending into the casing, g, and formed preferably in one with the member, 18, is an extension, 20, having a forked end provided with holes. The lever, *i*, is in this construction fulcrumed at an intermediate point in its length to a support, 22, formed in the casing, *g*. The holes on the extension, 20, of the member, 18, engage with pins, 23, on the end of the lever, *i*. The other end of this lever is in contact with the stem of a valve, 24, which controls a passage, 25, communicating between the interior of the casing, *g*, and a chamber 26. Into this chamber, 26, the feed water is conducted by a pipe, 27, and thence by another pipe, 28, past a non-return valve, 29, to the boiler. A spring, 30, normally presses the valve, 24, on to its seat thus cutting off the communication between the passage 25 and the chamber 26. Assume that the water is up to the level of the grid, 11, the steam entering the tube, *d*, will therefore be at its lowest temperature. The tube will also be at its minimum length and the valve, 24, will be pressed upon the lever, *i*. The feed water will then be able to escape by the passage, 26, into the interior of the casing, *g*, whence it is conducted away by a pipe, 31. Should the water level however fall, the temperature of the steam will be higher and the tube, *d*, will consequently expand. The spring, 30, will then close the valve, 24, and the water will then be fed into the boiler until the normal level has again been reached. This form of the feed water controlling device might also be used when the tube, *d*, is placed within the boiler.

Although we have described our thermostat in conjunction with a boiler for maintaining a constant water lever therein, we do not confine ourselves to this application. For instance, it can be applied to brewing and distilling plants and in plants for the concentration of liquids by evaporation and re-condensation for the purpose of maintaining a liquid at a constant level.

It will be seen that many modifications may be made in the method of carrying this invention into effect without in any way departing from the spirit of the same.

Having thus described our invention, what we claim as new and desire to secure by Letters Patent is:—

1. In an apparatus for regulating the level of the liquid in a vapor generator, a thermostatic element through which a superheated fluid is always passing, a part of said element being situated at the desired liquid level, the operation of said element depending upon the rate of flow of heat from the superheated fluid to the vapor and the liquid respectively in accordance with the liquid level in said generator.

2. In an apparatus for regulating the level of the liquid in a vapor generator, a thermostatic element through which a fluid is always passing, means for superheating said fluid and means for holding said element at the liquid level required in the generator, the mean temperature of said element itself thus depending upon the physical state of the surrounding fluid, whether liquid or gaseous, whereby on the liquid level in said generator changing, the mean temperature of said element is affected, valve means operated by the consequent change in length of said element to effect the re-adjustment of the liquid level in the generator.

3. In an apparatus for regulating the level of the liquid in a vapor generator, a thermostatic element through which a fluid is always passing, means for superheating said fluid and means for holding said element at the liquid level required in the generator, one end of said element being fixed, the mean temperature of said element itself thus depending upon the physical state of the surrounding fluid, whether liquid or gaseous, valve means operated by said element and acting to control the liquid level in said generator, whereby on the liquid level in said generator changing the mean temperature of said element is affected and the consequent change in length utilized to effect the re-adjustment of the liquid level in the generator.

4. In a vapor generator, a thermostatic device having an operating element, the external surface of which is in contact with the liquid or the vapor in said generator according to the liquid level therein, a fluid always passing through said element and means for superheating said fluid, the vapor absorbing heat from the superheated fluid at a different rate than the liquid whereby changes in the liquid level in the generator cause said element to expand or to contract.

5. In a vapor generator, a thermostatic device having an operating element, the external surface of which is in contact with the liquid or the vapor in said generator according to the liquid level therein, a fluid always passing through said element and means for superheating said fluid, the vapor in the generator absorbing heat from said fluid at a different rate than the liquid whereby changes in the liquid level in the generator cause said element to expand or to contract and means for utilizing said expansion or contraction to effect the re-adjustment of the liquid level in the generator.

6. In a vapor generator, a thermostatic device having an operating element placed at the level of the liquid in the generator, a superheated fluid always passing through said element and imparting heat to the surrounding liquid or vapor and means for utilizing the changes produced on said element by the physical state of the surrounding fluid to maintain a constant liquid level in the generator.

7. In conjunction with a liquid evaporating element, a thermostat device for controlling the supply of liquid to said element, comprising in combination a tube through which a superheated fluid is always passing, said tube being fixed at one end, means for supporting said tube in the vapor of the liquid within the element, pump means delivering liquid to said evaporating element, and pump controlling means connected with the free end of said tube, whereby the amount of liquid delivered to said element depends on the amount of the surface of said tube exposed to the liquid and the vapor thereof.

8. In conjunction with a liquid evaporating element, a thermostatic device for controlling the supply of liquid to said element, comprising in combination a tube fixed at one end, through which a superheated fluid is always passing, means for supporting said tube in the vapor of the liquid within said element, means delivering liquid to said evaporating element, lever means attached to the free end of said tube and controlling the delivery means, whereby the amount of liquid delivered to the evaporating element depends on the amount of surface of said tube exposed to said liquid, or the vapor thereof.

9. In conjunction with a liquid evaporating element, a thermostatic device for controlling the supply of liquid to said element, comprising in combination a tube fixed at one end and through which a superheated fluid is always passing, means for supporting said tube in the vapor of the liquid within said element, means delivering liquid to said evaporating element, lever means attached to the free end of said tube, a valve controlled by said lever means, whereby on the liquid level in said evaporating element falling, said tube expands and moves the valve so as to admit of the fluid flowing through the tube to said delivery means.

In testimony whereof, we affix our signatures in presence of two witnesses.

WALTER EAST.
ARCHIBALD EDWARD DOBBS.
JOHN SHIRLEY HOWKINS.

Witnesses to the signatures of the said Walter East and John Shirley Howkins:
    DANIEL D. BAIRD,
    P. A. OUTHWAITE.
Witnesses to the signature of the said Archibald Edward Dobbs:
    EDWARDS HARVEY,
    SOPHIA E. DOUGLAS.

---

Copies of this patent may be obtained for five cents each, by addressing the "Commissioner of Patents, Washington, D. C."